United States Patent
Xie et al.

(10) Patent No.: US 9,977,548 B2
(45) Date of Patent: May 22, 2018

(54) TOUCH PANEL AND TOUCH ELECTRODE STRUCTURE THEREOF

(71) Applicant: TPK Touch Solutions (Xiamen) Inc., Xiamen (CN)

(72) Inventors: Yanjun Xie, Wuhan (CN); Yau-Chen Jiang, Jhubei (TW); Bin Lai, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 32 days.

(21) Appl. No.: 14/526,487

(22) Filed: Oct. 28, 2014

(65) Prior Publication Data

US 2015/0116265 A1    Apr. 30, 2015

(30) Foreign Application Priority Data

Oct. 28, 2013   (CN) .......................... 2013 1 0516175

(51) Int. Cl.
   *G06F 3/044*   (2006.01)

(52) U.S. Cl.
   CPC .................................. *G06F 3/044* (2013.01)

(58) Field of Classification Search
   CPC .. G06F 3/044; G06F 2203/04111–2203/04113
   See application file for complete search history.

(56) References Cited

U.S. PATENT DOCUMENTS

| | | | | |
|---|---|---|---|---|
| 8,754,662 | B1* | 6/2014 | Weng | G01R 27/2605 324/686 |
| 2011/0279169 | A1* | 11/2011 | Salaverry | G06F 3/0416 327/517 |
| 2011/0279409 | A1* | 11/2011 | Salaverry | G06F 3/0416 345/174 |
| 2014/0267137 | A1* | 9/2014 | Solven | G06F 3/0416 345/174 |
| 2015/0060255 | A1* | 3/2015 | Chen | H03K 17/9622 200/5 R |

* cited by examiner

*Primary Examiner* — Xuemei Zheng
(74) *Attorney, Agent, or Firm* — Paul David Bendemire

(57) ABSTRACT

A touch panel and a touch electrode structure thereof are provided. The touch electrode structure defines position units and includes electrodes electrically insulated from each other. Each of the electrodes covers more than one of the position units and comprises a plurality of sub-electrodes electrically insulated from each other. Each of the sub-electrodes includes sub-electrode units. Each of the position units is corresponding to at least one of the sub-electrode units of at least one of the sub-electrode, and combinations of the sub-electrode units of the different sub-electrodes in the respective position units are different. In the touch electrode structure, each electrode can be electrically independent without needing to dispose a jumper and an insulating layer, thus simplifying process steps and improving a yield rate at the same time.

18 Claims, 5 Drawing Sheets

TOUCH PANEL AND TOUCH ELECTRODE STRUCTURE THEREOF

This application claims priority to Chinese Application Serial Number 201310516175.3, filed Oct. 28, 2013, which is herein incorporated by reference.

BACKGROUND OF THE INVENTION

Field of Invention

The present invention relates to a field of a touching technology. More particularly, the present invention relates to a touch panel and a touch electrode structure thereof.

Description of Related Art

In the current market of consumer electronic products, a touch function combined into a display has become a trend of the mainstream for the development of portable electronic products. A touch panel has been applied to many kinds of electronic products such as smart phones, mobile telephones, tablet PCs and notebooks. Since a user can operate and issue a command through objects shown on a display, a touch panel provides a human interface between the user and the electronic product.

In general, a touch panel includes a touching area and a peripheral area surrounding the touching area. The touching area is configured to generate a sensing signal, and several peripheral wires are disposed in the peripheral area for transmitting the sensing signal to a signal processing unit for computation, thereby determining a coordinate of a touch position.

In a normal design of an electrode structure, please refer to FIG. 1, which illustrates a schematic diagram of a touch electrode structure of a conventional touch panel 100 in the prior art. As shown in FIG. 1, a touch electrode pattern 104 is formed on a touching area 102 of the touch panel 100. The touch electrode pattern 104 includes horizontal electrodes 104a and vertical electrodes 104b. Each of the horizontal electrodes 104a and each of the vertical electrodes 104b are both constituted by connecting an electrode unit 104c. In this design, because the horizontal electrode 104a and the vertical electrode 104b intersect, a jumper 106 and an insulating layer 108 are used on the electrode pattern to isolate the horizontal electrodes 104a from the vertical electrodes 104b.

However, more than 5 lithography processes are generally needed if jumpers and insulating layers have to be disposed on the touch panel, and thus the fabrication of the conventional touch panel is complicated. Moreover, if one of the jumpers has an error, such as the jumper being broken or an electrostatic discharge, then the whole electrode will lose its functions. Therefore, the current industry still needs to improve the conventional touch electrode pattern used on the touch panel to reduce a production process and improve a yield rate.

SUMMARY OF THE INVENTION

To solve the above problems, the present invention provides a novel touch electrode structure, in which each electrode can be electrically independent from each other without needing to dispose jumpers and insulating layers, thus simultaneously having advantages of simplified processes and an improved yield rate.

According to an embodiment of the invention, a touch electrode structure is provided. Position units are defined in the touch electrode structure. The touch electrode structure includes electrodes electrically insulated from each other. Each of the electrodes covers more than one of the position units and includes sub-electrodes electrically insulated from each other. Each of the sub-electrodes includes sub-electrode units electrically connected to each other. Each of the position units is corresponding to at least one of the sub-electrode units of at least one of the sub-electrodes. In addition, combinations of the sub-electrode units from the different sub-electrodes in the respective position units are different.

According to another embodiment of the invention, a touch panel is provided. The touch panel includes a base board on which position units are defined. Electrodes are disposed on the base board and are electrically insulated from each other. Each of the electrodes covers more than one of the position units and includes sub-electrodes. Each of the sub-electrodes includes sub-electrode units electrically connected to each other. Each of the position units is corresponding to at least one of the sub-electrode units of at least one of the sub-electrodes. In addition, combinations of the sub-electrode units from the different sub-electrodes in the respective position units are different.

In the touch panel and the touch electrode structure provided in the invention, different touch position units are formed by different combinations of the sub-electrode units of different sub-electrodes. Therefore, no jumper or insulating layer is needed in the structure. The structure is simple and can achieve advantages of simplifying processes and improving a yield rate.

BRIEF DESCRIPTION OF THE DRAWINGS

The invention can be more fully understood by reading the following detailed description of the embodiment, with reference made to the accompanying drawings as follows.

DETAILED DESCRIPTION OF THE INVENTION

Specific embodiments of the present invention are further described in detail below with reference to the accompanying drawings.

Figure 1:
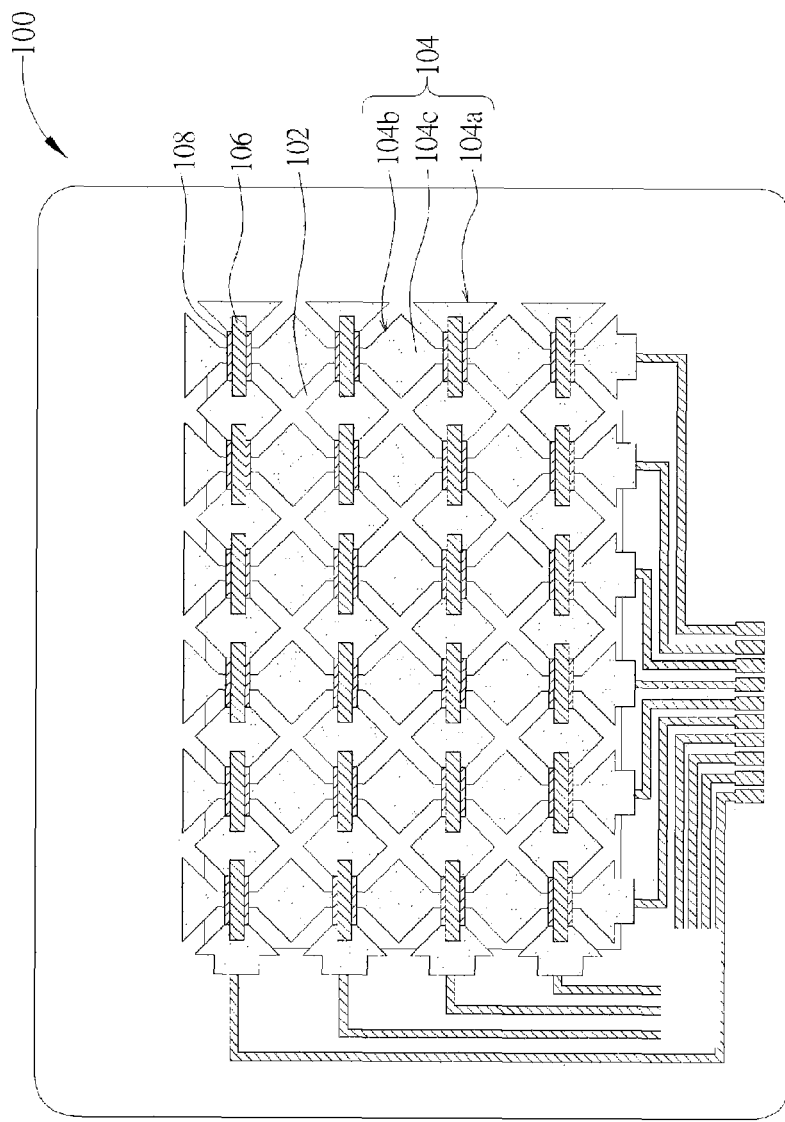
FIG. 1 is a top view illustrating a touch panel in the prior art.
Figure 2:
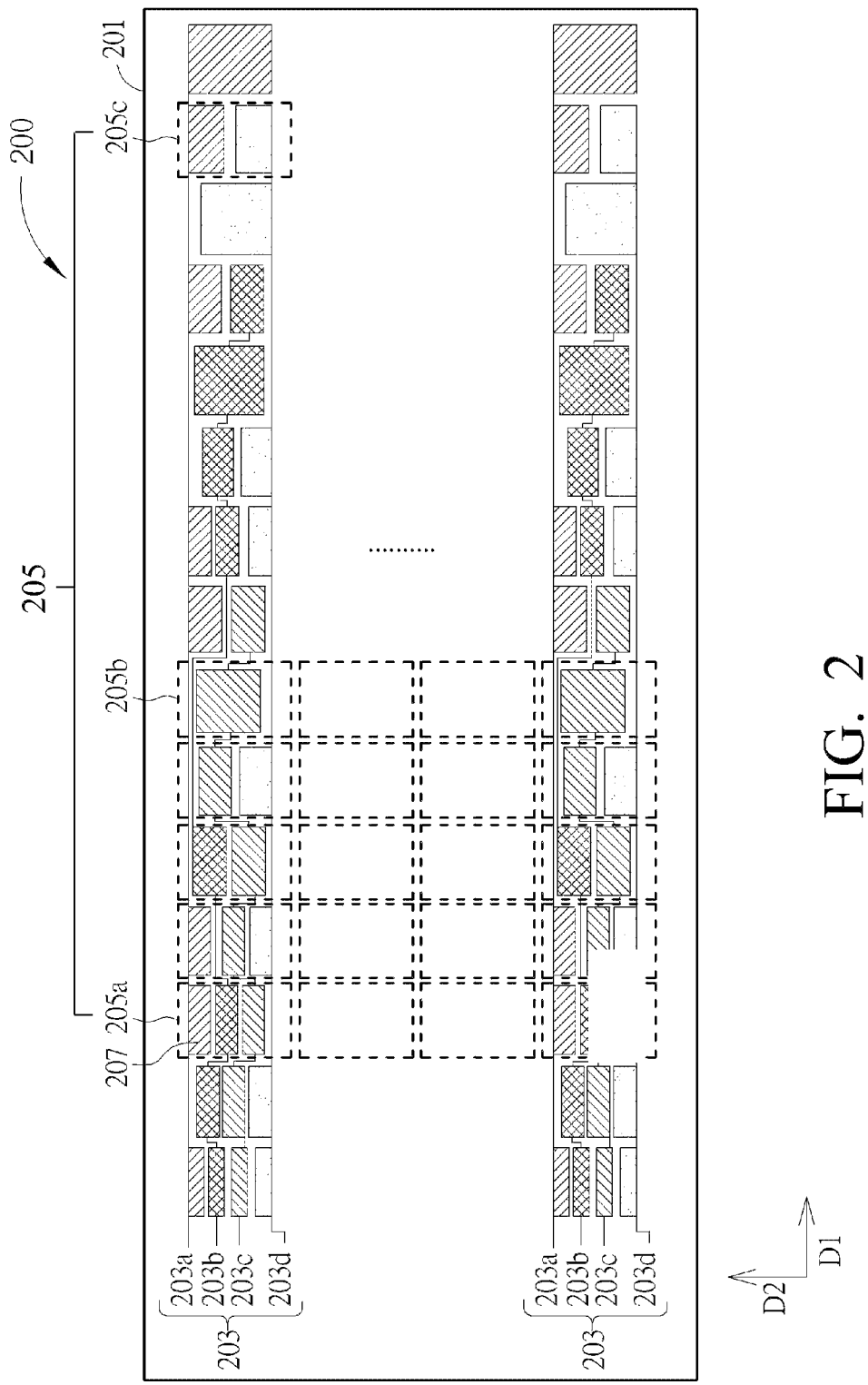
FIG. 2 is top view illustrating a touch panel according to an embodiment of the invention.

At first, referring to FIG. 2, which is a top view illustrating a touch panel according to an embodiment of the invention. As shown in FIG. 2, a touch panel 200 of the invention includes a base board 201 used for carrying and protecting components disposed thereon. In addition, the base board 201 may be a cover glass, in which electrodes are disposed on one side of the base board 201, and the other side can be used as a touching surface for a user. The base board 201 may be made of a hard material or a flexible transparent insulating material, such as glass, polyimide (PI), polypropylene (PP), polystyrene (PS), acrylonitrile-butadiene-styrene (ABS), polyethylene terephthalate (PET), polyvinyl chloride (PVC), polycarbonate (PC), polyethylene (PE), polymethyl methacrylate (PMMA), or polytetrafluoroethene (PTFE), etc. Position units 205 are defined on the base board 201. Each position unit 205 represents the smallest sensing unit allowed on the touch panel. All of the position units 205 may be arranged irk an array to collectively compose a touching area of the touch panel Referring to FIG. 2 again, electrodes 203, which are electrically insulated from each other, are disposed on the base board 201, and extend along a first direction D1. The electrodes 203 are arranged in parallel to each other, and cover position units 205 defined on the base board. A transparent conductive material such as indium tin oxide (ITO), indium zinc oxide (IZO), carbon nanotube (CNT) or nano silver may be used to form the electrodes 203 on the base board 201 by printing, lithography, laser etching, or the like. A feature of the invention is that each of the electrodes 203 is formed by plural sub-electrodes, and the sub-electrodes are electrically insulated from each other, such as four sub-electrode 203a-203d shown in the figure. Each of the sub-electrode 203a-203d is constructed by electrically connecting sub-electrode units 207 along the first direction D1, in which the connection may be achieved via transparent or opaque wires (now shown). The wires can be made of the same transparent conductive material used in the electrode unit 207, or metal such as copper, molybdenum, aluminum and the like. To be more specific, in the invention, in order to achieve a function of determining a touching position, as shown in FIG. 2, each position unit 205 includes or corresponds to at least one sub-electrode unit 207. More importantly, the sub-electrode units 207 that each of the position unit 205 includes or is corresponding to are determined according to combinations of the sub-electrode units 207 of different sub-electrodes 203a-203d. The detail will be described below.

Three different position units 205a, 205b and 205c shown in FIG. 2 are used as examples. The position unit 205a includes three sub-electrode units 207. The three sub-electrode units 207 respectively belong to the sub-electrodes 203a-203c, and extend along a second direction D2 perpendicular to the first direction D1. The position unit 205b only includes one sub-electrode unit of the sub-electrode 203c, and the position unit 205c includes sub-electrode units of the sub-electrodes 203a and 203d. A sum of areas of the sub-electrode units 207 in a position unit 205 is approximately equal to the area of the position unit. However, the area and the number of the sub-electrode units 207 included in each position unit 205 may not be equal to each other completely. In the invention, because combinations of the sub-electrode units in the sub-electrodes which the respective position units 205 correspond to are different, this design can give an unique identification to each position unit 205. That is, each position unit 205 uniquely corresponds to a combination of the sub-electrode units from different sub-electrodes. For example, in an implementation, when a user touches or approximates the position unit 205a on the base board with his/her finger or another touching object, the electrical signal (e.g. a voltage or a current caused by a mutual capacitance) at the position unit 205a will change. Because the position unit 205a includes the sub-electrode units of the sub-electrodes 203a-203c, the change of the electrical signal will result in changes of sensing signals of scanning outputs of the sub-electrodes 203a-203c. On the other hand, the sensing signal outputted from the sub-electrode 203d will not be affected, or the change thereof is very small compared to the changes of the sensing signals from the sub-electrodes 203a-203c. Therefore, a system may determine a touching position according to which sub-electrode outputs a sensing signal being changed or according to a magnitude of the change. For example, when the system synchronously inputs a driving signal to the sub-electrodes 203a~203d and then scans the sub-electrodes 203a~203d individually, if it detects that the sensing signals outputted from the sub-electrodes 203a~203c change, meaning that the touching position occurs at the position unit 205a exactly and simultaneously having the sub-electrode units of the sub-electrodes 203a~203c. Hence, based on the determination mechanism of the invention, as long as the permutations and the combinations of the sub-electrode units included in and corresponding to the respective position units 205 are different, the system is able to determine which position unit 205 that a touch is occurring on according to the change of the sensing signal from each sub-electrode. A single electrode 203 formed by four different sub-electrodes 203a-203d shown in FIG. 2 is used as an example. Under the premise that each position unit 205 can include at most four sub-electrode units 207, the combination of the sub-electrode units 207 has $C_1^4+C_2^4+C_3^4+C_4^4=4+6+4+1=15$ possibilities (including a situation of single sub-electrode unit). According to this design, 15 position units 205 can be successively disposed on each electrode 203 along the first direction D1. If an electrode row needs to include more position units 205 due to some invention requirements, the number of the combinations can be increased by increasing the number of the sub-electrodes of the electrodes 203. Furthermore, the design of the invention uses the combinations of the sub-electrode units of plural sub-electrodes to correspond to each of the position units. Compared to a conventional skill in which a wire is disposed on each position unit to connect with a controller, the design of the invention can decrease the number of the wires connected to the controller so as to reduce the area of the peripheral area occupied by the wires, thus benefiting a narrow border design of a touch panel.

Figure 3:
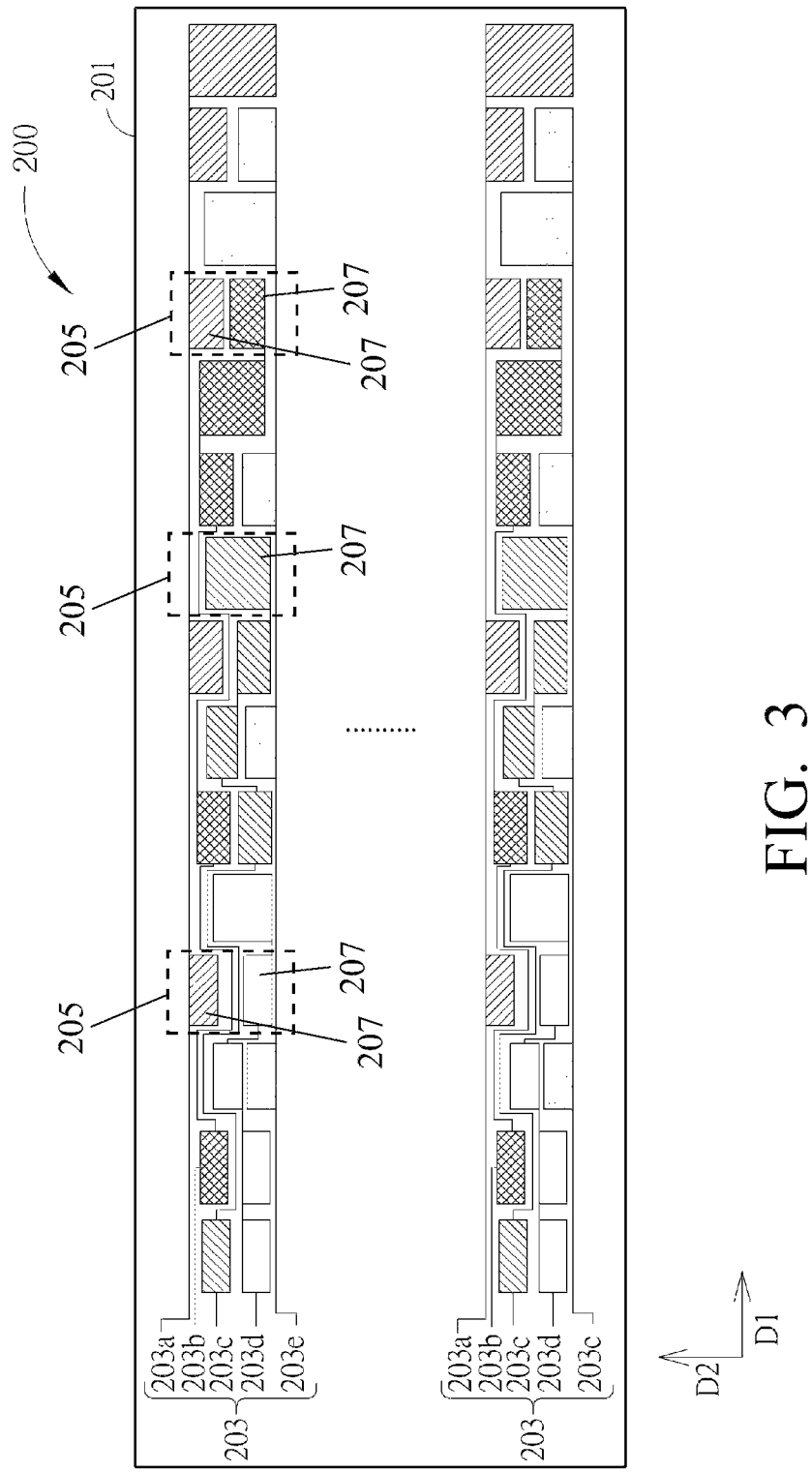
FIG. 3 is a top view illustrating a touch panel according to another embodiment of the invention.

Referring to FIG. 3, FIG. 3 is a top view illustrating a touch panel according to another embodiment of the invention. A difference between the pattern of the touch electrode in FIG. 2 and that in FIG. 3 is that the electrode 203 in FIG. 3 is constructed by five different sub-electrodes 203a-203e instead of four sub-electrodes, and each position unit 205 includes at most two sub-electrode units 207. In this configuration, the combination of the sub-electrode units 207 has $C_1^5+C_2^5=5+10=15$ possibilities, and the number of the combinations is equal to the number thereof in FIG. 2. It is understood that the combinations of the sub-electrode units in five sub-electrodes 203a-203e of the present embodiment may also use the method shown in FIG. 2, such that the number of the combinations of the sub-electrode units in the sub-electrodes 203a-203e will increase with the additional sub-electrode. Therefore, the number of the position units 205 included in the single electrode 203 will increase accordingly, and is suitable for use in touch panel designs with different sizes.

Figure 4:
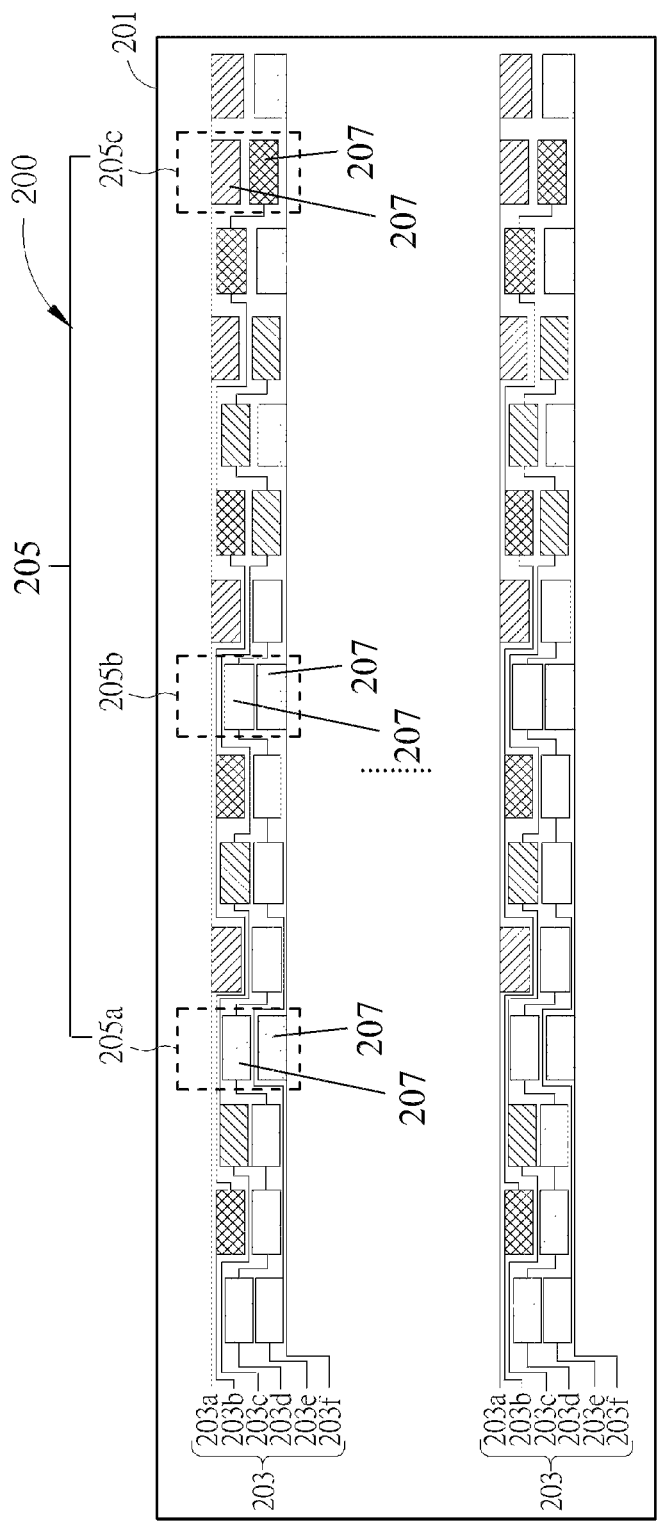
FIG. 4 is a top view illustrating a touch panel according to yet another embodiment of the invention.

Referring to FIG. 4, FIG. 4 is a top view illustrating a touch panel according to yet another embodiment of the invention. A difference between the patterns of the touch electrode in FIG. 4 and that in FIG. 3 is that the electrode 203 in FIG. 4 is constructed by six different sub-electrodes 203a-203f instead of five ones, and the number of the sub-electrode units 207 corresponding to each position unit 205 is the same. A condition that each position unit 205 corresponds to two sub-electrode units is used as an example herein. In this configuration, there are $C_2^6=15$ combinations of the sub-electrode units, and the number of the combinations is equal to the numbers thereof in FIGS. 2 and 3.

Three different position units 205a, 205b and 205c shown in FIG. 4 are as examples, in which each of the position units 205a, 205b and 205c includes two different sub-electrode units 207. The position unit 205a includes the sub-electrode units 207 respectively belonging to the sub-electrodes 203d and 203f. The position unit 205b includes the sub-electrode units 207 respectively belonging to the sub-electrodes 203e and 203f. The position unit 205c includes the sub-electrode units 207 respectively belonging to the sub-electrodes 203a and 203b. In the invention, because the combinations of the sub-electrode units in the sub-electrode which the respective position units 205 correspond to are different, the design may give each position unit 205 an unique identification, that is, each position unit 205 is uniquely corresponding to a combination of the sub-electrode units of different sub-electrodes so as to achieve the function of determining touch positions. For example, while a touch sensing is performed, each electrode 203 is driven and scanned. Vertical coordinates of different touch points can be determined according to changes of sensing signals sent from the electrodes 203 located at different row locations. Horizontal coordinates (corresponding to horizontal coordinates of the respective position units 205) of the touch points can be determined according to the combination of the sub-electrode units of the different sub-electrodes included in the position units 205. For example, the horizontal coordinates of different position units 205a, 205b and 205 can be determined according to the following method. Every two sub-electrodes respectively are collaborated for driving and scanning. For example, the sub-electrode 203a is driven, and the sub-electrodes 203b, 203c, 203d, 203e and 203f are respectively scanned (sensed); alternatively, the sub-electrode 203b is driven, and the sub-electrodes 203a, 203c, 203d, 203e, and 203f are respectively scanned (sensed), and so on. If a touch point is at the position unit 205a, the sensing signal obtained by driving the sub-electrode 203d and scanning the sub-electrode 203f will change because the sub-electrode units 207 included in the position unit 205a are belonging to the electrodes 203d and 203f; and the sensing signals obtained from other combinations for driving and scanning, such as driving the sub-electrode 203c and scanning the sub-electrodes 203a, 203b, 203d, 203e and 203f, will not change. If the touch position is at the position unit 205b, the sensing signal obtained by driving the sub-electrode 203e and scanning the sub-electrode 203f will change because the sub-electrode units 207 included in the position unit 205b are belonging to the electrodes 203e and 203f; and the sensing signals obtained from other combinations of driving and scanning, such as driving the sub-electrode 203e and scanning the sub-electrodes 203a, 203b, 203c, 203d and 203f, will not change. If the touch position is at the position unit 205c, the sensing signal obtained by driving the sub-electrode 203a and scanning the sub-electrode 203b will change because the sub-electrode units 207 included in the position unit 205b are belonging to the electrodes 203a and 203b; and the sensing signals obtained from other combinations of driving and scanning, such as driving the sub-electrode 203a and scanning the sub-electrodes 203c, 203d, 203e, and 203f, will not change. Accordingly, the horizontal coordinates of different touch positions can be distinguished. The embodiment merely describes one of scanning and sensing methods, and the invention is not limited thereto. In the present embodiment, the numbers of the sub-electrode units 207 included in and corresponding to different position units 205 are the same and are fewer than that in FIG. 2, which may reduce signal interference between different sub-electrodes so as to increase touch panel precision.

It can be known from the embodiments of FIG. 2 to FIG. 4 that, the number of the position units 205 covered by and corresponding to a single row of electrodes 203 can be determined according to the number of the sub-electrodes constituting the electrode 203 and the number of the sub-electrode units 207 that one position unit 205 can include. Increasing the numbers of the sub-electrodes and the sub-electrode units included therein can increase the number of the position units. However, the area of the sub-electrode unit 207 has to be reduced when the number of the sub-electrode units 207 included by the single position unit 205 is increased, thus decreasing touching sensitivity. Therefore, in the invention, how many sub-electrodes used in each electrode and the number of the sub-electrode units 207 included in each position unit 205 can be decided according to the number of the position units required in practical configurations and the required touching sensitivity.

The advantages of the touch electrode structure and the touch panel provided by the invention are that, in a circuit design, only one conducting layer is needed to complete the entire touch electrode structure by patterning, without needing to use a jumper to connect the electrode units of the same electrode in the prior art, because each electrode 230 and each sub-electrode do not intersect. This circuit design has a simple structure, requires fewer process steps, has better reliability, and does not have the problems such as broken jumpers and electrostatic discharges that often occur.

Figure 5:
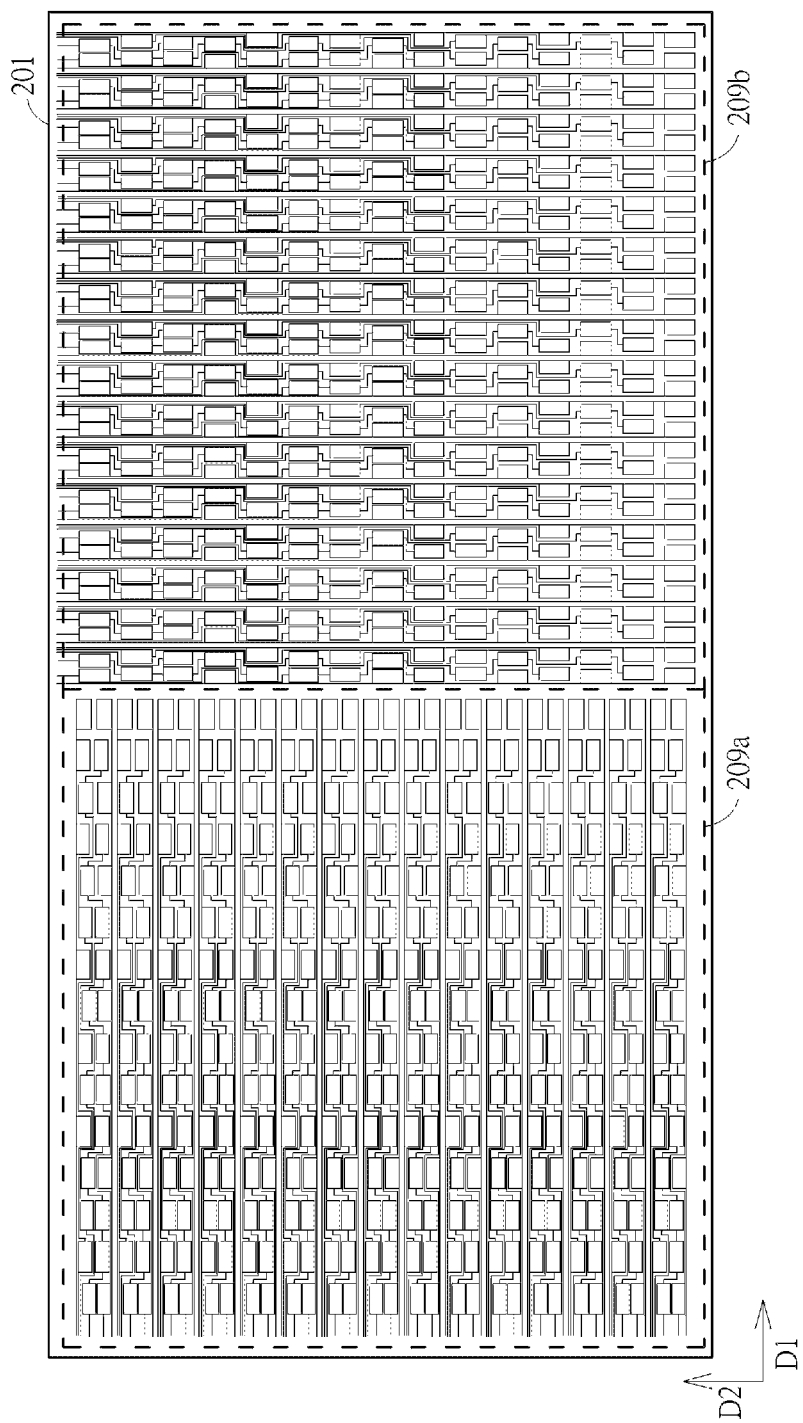
FIG. 5 is a top view illustrating a touch panel having electrode regions according to an embodiment of the invention.

On the other hand, referring to FIG. 5, FIG. 5 is a top view illustrating a touch panel having electrode regions according to an embodiment of the invention. In the implementation, in response to larger-size panel designs, electrode regions may be defined on the base board 201 for arranging the electrodes extending along different directions. For example, as shown in FIG. 5, the electrodes disposed in an electrode region 209a extend along the first direction D1, and the electrodes disposed in an electrode region 209b extend along the second direction D2 perpendicular to the first direction D1. This design can significantly reduce the number of the position units required to be covered by each electrode, so as to avoid using too many sub-electrodes and increasing the complexity of the circuit design. It is noted that the directions with which the electrodes may extend are not limited to the horizontal direction and the vertical direction shown in the figure, but the electrodes may be disposed inclined with respect to the periphery areas.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch electrode structure defining a plurality of position units, the touch electrode structure comprising:
   a plurality of electrodes electrically insulated from each other, wherein:
      each of the plurality of electrodes comprises a plurality of sub-electrodes extending along a first direction and electrically insulated from each other,
      each of the plurality of electrodes is associated with a plurality of position units arranged along the first direction, each of the plurality of sub-electrodes comprises a plurality of sub-electrode units respectively contained by one of the plurality of position units, a sum of areas of sub-electrode units contained by one of the position units is substantially identical for all of the plurality of position units, each of the plurality of position units contains sub-electrode units among the plurality of sub-electrodes corresponding to different ones of the plurality of sub-electrodes from each other, a first electrode of the plurality of electrodes is associated with at least a first position unit of the plurality of position units and a second position unit of the plurality of position units, the first position unit comprises:
  a first sub-electrode unit of a first sub-electrode of the first electrode; and
  a second sub-electrode unit of a second sub-electrode of the first electrode, and the second position unit comprises a third sub-electrode unit of the first sub-electrode, wherein:
  the third sub-electrode unit is coupled in series with the first sub-electrode unit,
  a first size of the first sub-electrode unit is different than a third size of the third sub-electrode unit, where the first size of the first sub-electrode unit and the third size of the third sub-electrode unit are measured in a second direction that is perpendicular to the first direction along which the first electrode extends, and
  a number of sub-electrode units contained within the first position unit is different than a number of sub-electrode units contained within the second position unit.

2. The touch electrode structure of claim 1, wherein the first sub-electrode unit and the second sub-electrode unit are stacked along the second direction.

3. The touch electrode structure of claim 1, further comprising a plurality of electrode regions, wherein:
  each of the plurality of electrode regions comprises a subset of the plurality of electrodes,
  electrodes in a first electrode region of the plurality of electrode regions, including the first electrode, extend along the first direction, and
  electrodes in a second electrode, region of the plurality of electrode regions extend along the second direction.

4. The touch electrode structure of claim 1, wherein the plurality of electrodes are parallel with each other.

5. The touch electrode structure of claim 1, wherein the first sub-electrode and the second sub-electrode do not intersect.

6. The touch electrode structure of claim 1, wherein an area of the first position unit is equal to a sum of areas of all sub-electrode units contained within the first position unit, including the first sub-electrode unit and the second sub electrode unit.

7. The touch electrode structure of claim 1, wherein:
  an area of the second position unit is equal to a sum of areas of all sub-electrode units contained within the second position unit, including the second sub-electrode unit, and
  no sub-electrode unit of the second sub-electrode is contained within the second position unit.

8. The touch electrode structure of claim 7, wherein the area of the second position unit is approximately equal to the area of the first position unit.

9. The touch electrode structure of claim 1, wherein an area of the first sub-electrode unit is different than an area of the third sub-electrode unit.

10. The touch electrode structure of claim 1, wherein a position of the first sub-electrode unit relative to boundaries of the first position unit is different than a position of the third sub-electrode unit relative to boundaries of the second position unit.

11. The touch electrode structure of claim 1, wherein the second position unit comprises a fourth sub-electrode unit of a third sub-electrode of the first electrode.

12. The touch electrode structure of claim 1, wherein the second position unit of the plurality of position units comprises a fourth sub-electrode unit of the second sub-electrode.

13. A touch panel comprising:
  a base board, wherein a plurality of position units are defined on the base board, and
  a plurality of electrodes electrically insulated from each other and disposed on the base board, wherein:
    each of the plurality of electrodes comprises a plurality of sub-electrodes extending along a first direction and electrically insulated from each other,
    each of the plurality of electrodes is associated with a plurality of position units arranged along the first direction,
    each of the plurality of sub-electrodes comprises a plurality of sub-electrode units respectively contained by one of the plurality of position units,
    a sum of areas of sub-electrode units contained by one of the position units is substantially identical for all of the position units,
    each of the plurality of position units contains sub-electrode units among the plurality of sub-electrodes corresponding to different ones of the plurality of sub-electrodes from each other,
    a first electrode of the plurality of electrodes is associated with at least a first position unit of the plurality of position units and a second position unit of the plurality of position units,
    the first position unit comprises:
      a first sub-electrode unit of a first sub-electrode of the first electrode, wherein the first sub-electrode unit lies within a first plane that extends in the first direction along which the first electrode extends and has a first length measured in the first direction and a first width measured in a second direction perpendicular to the first direction, and the second position unit comprises:
      a second sub-electrode unit of the first sub-electrode, wherein:
        the second sub-electrode unit is coupled in series with the first sub-electrode unit,
        the second sub-electrode unit lies within a second plane parallel to the first plane and has a second length measured in the first direction and a second width measured in the second direction,
        the second length is equal to the first length,
        the second width is different than the first width, and
        a number of sub-electrode units contained within the first position unit is different than a number of sub-electrode units contained within the second position unit.

14. The touch panel of claim 13, wherein;
  the first position unit comprises a third sub-electrode unit of a second sub-electrode of the first electrode, and the first sub-electrode unit and the third sub-electrode unit are stacked along the second direction.

15. The touch panel of claim 13, wherein;
a plurality of electrode regions are defined on the base board,
electrodes in a first electrode region of the plurality of electrode regions, including the first electrode, extend along the first direction,
each of the plurality of electrode regions covers more than one of the plurality of electrodes, and
electrodes in a second electrode region of the plurality of electrode regions extend along a direction different than the first direction.

16. The touch panel of claim 13, wherein an area of the first position unit is equal to a sum of areas of all sub-electrode units contained within the first position unit, including the first sub-electrode unit.

17. The touch panel of claim 13, wherein:
the first position unit comprises a third sub-electrode unit of a second sub-electrode of the first electrode, and
the second position unit comprises a fourth sub-electrode unit of a third sub-electrode of the first electrode.

18. The touch panel of claim 17, wherein the second position unit is adjacent the first position unit.

\* \* \* \* \*